United States Patent [19]

Miyoshi et al.

[11] Patent Number: 4,551,991

[45] Date of Patent: Nov. 12, 1985

[54] MULTI-EFFECT ABSORPTION REFRIGERATING MACHINE

[75] Inventors: Nobutaka Miyoshi, Tokyo; Shigeo Sugimoto; Michihiko Aizawa, both of Ibaraki, all of Japan

[73] Assignee: Hitachi, Ltd., Tokyo, Japan

[21] Appl. No.: 702,749

[22] Filed: Feb. 19, 1985

[30] Foreign Application Priority Data

Feb. 22, 1984 [JP] Japan .................................. 59-30236

[51] Int. Cl.⁴ ............................................. F25B 15/00
[52] U.S. Cl. .................................................... 62/476
[58] Field of Search .......................................... 62/476

[56] References Cited

U.S. PATENT DOCUMENTS 3,389,570 6/1968 McGrath .......................... 62/476 X
3,389,572 6/1968 Papapanu ........................ 62/476 X
3,389,573 6/1968 Papapanu et al. ................ 62/476 X
3,831,397 8/1974 Mamiga ............................. 62/476

*Primary Examiner*—Lloyd L. King
*Attorney, Agent, or Firm*—Antonelli, Terry & Wands

[57] ABSTRACT

The present invention is provided with an evaporator, a primary absorber, a plurality of generators, a condenser and a direct contact type heat exchanger which is provided with auxiliary evaporator-absorber stages in a plural set. These evaporator-absorber stages in a plural set are divided into a plurality of groups and connected so that a solution is sent from the final absorber stage of each group into each generator. By this construction, the solution in a first generator of a plurality of generators can be made to work at a lower level of temperature than usual.

6 Claims, 2 Drawing Figures

MULTI-EFFECT ABSORPTION REFRIGERATING MACHINE

BACKGROUND OF THE INVENTION

1. Field of the Invention

The present invention relates to a multi-effect absorption refrigerating machine, such as an absorption refrigerating machine, a water cooling-heating machine or a heat pump absorption refrigerating machine, which is provided with two or more generators.

2. Description of Prior Art

Disposition of a direct contact type heat exchanger provided with evaporator-absorber stages in a solution channel between a primary absorber and generators in a conventional multi-effect absorption refrigerating machine has been disclosed, for instance, in U.S. Pat. Nos. 3,389,570, 3,389,571, 3,389,572, 3,389,573, 3,389,574 and 3,396,549.

In these prior art examples, however, the whole of a dilute solution generated in a final evaporator-absorber stage is supplied to a first generator, and thus a second generator is supplied with this solution after it has been concentrated in the first generator.

Therefore, the concentration of the solution supplied to the second generator is medium (between the concentration of the solution supplied to the first generator and that of the solution coming out of the second generator).

Meanwhile, the saturation temperature of refrigerant vapor working as a heat source is increases as the concentration of the solution in the second generator and the internal pressure thereof increases. In a double-effect system, the refrigerant vapor generated in the first generator is the heat source for the second generator; therefore the saturation temperature of the refrigerant vapor in the first generator must be increased in response to the increase in the concentration of the solution in the second generator and the internal pressure thereof.

Thus, the saturation temperature of the refrigerant vapor in the first generator is inevitably high in conventional machines, and this has brought about the following problems.

(1) A heat source generating high temperature output is required.

(2) Since the temperature of the solution in the first generator is high, the corrosiveness of the solution is sharply increased, thereby rapidly corroding the wall of the generator, lessening the durability thereof.

SUMMARY OF THE INVENTION

An object of the present invention is to furnish a multi-effect absorption refrigerating machine, in which the temperature of a solution inside a first generator rises to a maximum level, which can be made to work at a lower temperature than usual.

Another object of the present invention is to furnish a multi-effect absorption refrigerating machine which is prevented from inducing corrosion and thus has excellent durability.

To attain the above-stated objects, a plurality of auxiliary absorber stages sequentially connected are provided in a supply channel for supplying a solution from a primary absorber to a plurality of generators, and a plurality of auxiliary evaporator stages also sequentially connected are provided in a return channel for returning the solution from the generators to the primary absorber, while each evaporator stage is made to communicate with each absorber state corresponding thereto with respect to a pressure level by a vapor passage so that the refrigerant vapor vaporizing from the solution in each evaporator stage can be absorbed by the solution in the absorber stage, according to the present invention. By this construction, an evaporation-absorption process diluting the solution supplied from the primary absorber is repeated sequentially in a plural stage, while the solution having passed through the evaporation-absorption process is supplied to each and every generator without passing through any other generator.

As described above, the refrigerant vapor vaporizing in each evaporator stage from the solution returning from the generator to the primary absorber is absorbed by the solution (flowing from the primary absorber toward the generators) in the absorber stage, and the solution in the absorber stage is diluted with said vapor. Simultaneously, the latent heat of the refrigerant vapor which is obtained in the vaporization in the evaporator stage is released when the vapor is absorbed by the solution in the absorber stage. In other words, heat flows from the solution in the evaporator stage to that in the absorber stage. Consequently, the temperature of the solution in the absorber stage rises every time an absorbing action is repeated.

Figure 1:
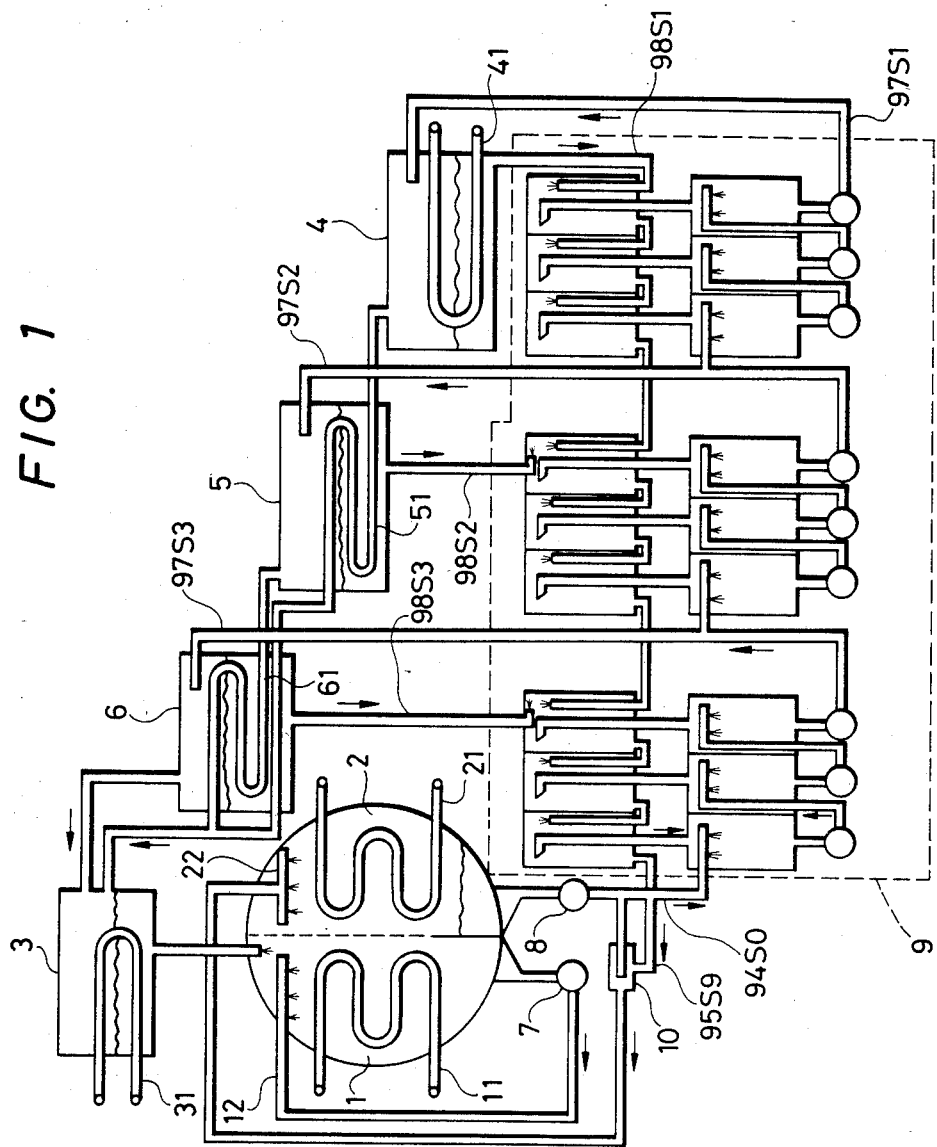
FIG. 1 is a system diagram of one embodiment of the present invention.
Figure 2:
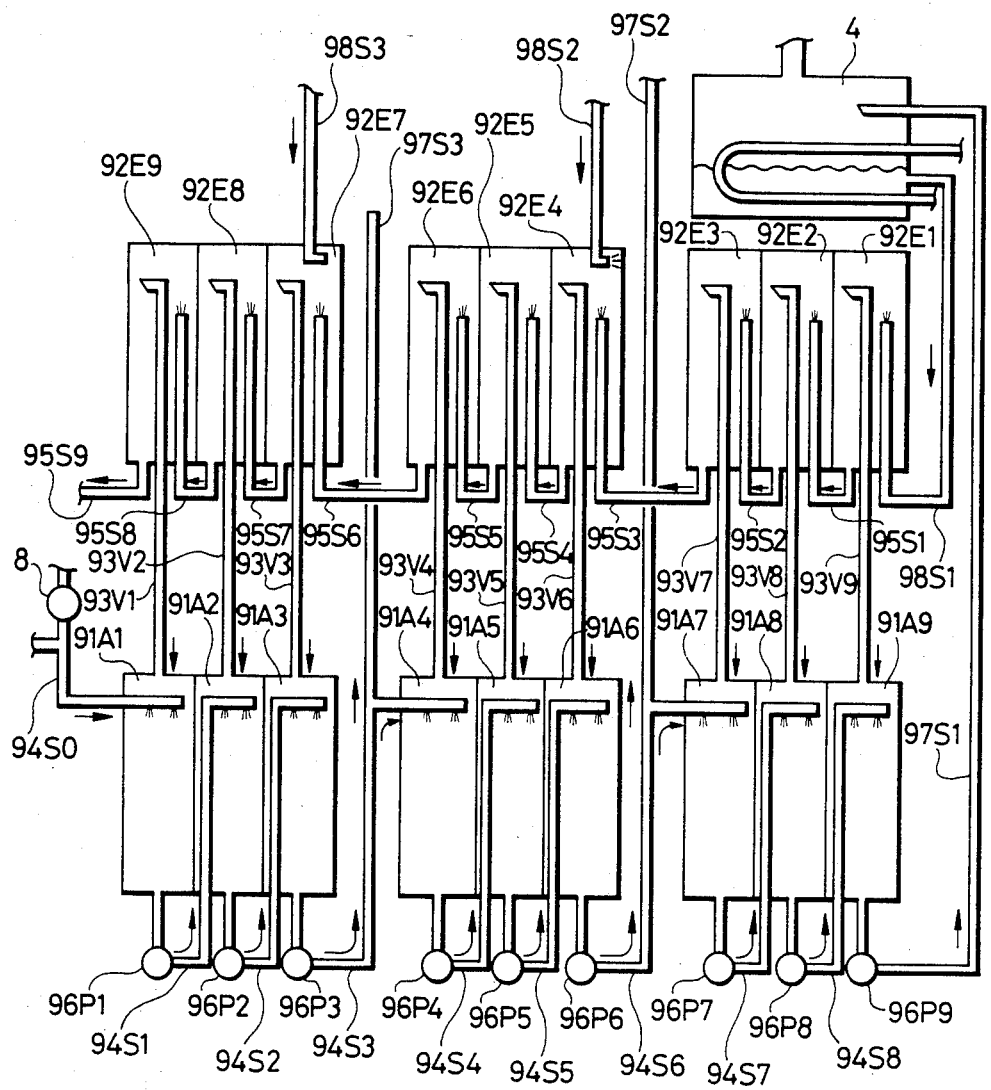
FIG. 2 is a detailed system diagram of a principal section of the present invention.

The embodiment shown in these figures is a triple-effect absorption refrigerating machine, in which water is used as a refrigerant, and a water solution of lithium bromide (LiBr) as an absorbent. In this apparatus, moreover, air-cooling can be performed by using the cold water obtained from an evaporator, and heating can also be performed by using the cooling water (hot water) in the primary absorber and/or a condenser.

DETAILED DESCRIPTION OF THE PREFERRED EMBODIMENT

Basically, this apparatus comprises an evaporator 1, a primary absorber 2, a condenser 3, a first generator 4, a second generator 5, a third generator 6, a direct contact type heat exchanger 9, a refrigerant pump 7, and a solution pump 8.

The evaporator 1 is provided with a cold water pipe 11 through which a medium (water) to be cooled passes, and a spray header 12 which sprays the cold water pipe 11 with a refrigerant, and it evaporates a refrigerant liquid flowing thereinto from the condenser 3 and takes in latent heat, while evaporating the refrigerant, from the water which passes through the cold water pipe 11, so as to produce cold water.

The primary absorber 2 is provided with a cooling water pipe 21 through which a cooling medium (cooling water) passes, and a spray header 22 which sprays the cooling water pipe 21 with a solution. In this absorber 2, refrigerant vapor flowing thereinto from said evaporator 1 is absorbed in a solution which has returned from each of the generators 4, 5 and 6, and thereby a dilute solution of thin concentration (i.e. a solution containing a large quantity of refrigerant) is produced. The condenser 3 is provided with a cooling water pipe 31 through which a cooling medium (cooling water) passes, and it cools, with the cooling water, the refrigerant liquid produced in each of said first and second generators 4 and 5 and heated in the second and third generators 5 and 6 and the refrigerant vapor produced in the third generator 6, thus turning them into a refrigerant liquid.

The first generator 4 is provided with a heater 41, such as a burner or a superheated steam, pipeline heating the dilute solution sent from the primary absorber 2 by means of said heater 41, so as to produce refrigerant vapor.

The second generator 5 is provided with a heating pipe 51 through which the refrigerant vapor produced in the first generator passes, heating the dilute solution sent from the primary absorber 2 by the refrigerant vapor from the first generator, so as to produce refrigerant vapor.

The third generator 3 is provided with a heating pipe 61 through which the refrigerant vapor produced in the second generator 5 passes, heating the dilute solution sent from the primary absorber 2 by the refrigerant vapor from the second generator 5, so as to produce refrigerant vapor. The refrigerant pump 7 is provided for the spray header 12 of the evaporator 1 and sends under pressure a refrigerant liquid to the spray header 12. The solution pump 8 communicates with the bottom portion of the primary absorber 2 to send the dilute solution produced in the absorber 2 into the absorber stages of the direct contact type heat exchanger 9. Part of the solution discharged from the solution pump 8 flows to the spray header 22 of the primary absorber 2 and is sprayed therefrom, together with the solution from each of the generators 4, 5 and 6, onto the cooling water pipe 21 of the absorber 2.

The direct contact type heat exchanger 9 is provided with nine auxiliary absorber stages 91A (91A1 to 91A9) separated into three groups, and auxiliary evaporator stages 92E (92E1 to 92E9) of the same number with said absorber stages, separated also into three groups. Furthermore, it is provided with a vapor passage 93V1 which connects the first absorber stage 91A1 with the ninth (last) evaporator stage 92E9 and makes only the refrigerant vapor of the evaporator stage 92E9 flow into the absorber stage 91A1, and further vapor passages 93V2, 93V3, 93V4, 93V5, 93V6, 93V7, 93V8 and 93V9 which connect likewise the second absorber stage 91A2 with the eight evaporator stage 92E8, the third absorber stage 91A3 with the seventh evaporator stage 92E7, the fourth absorber stage 91A4 with the sixth evaporator stage 92E6, the fifth absorber stage 91A5 with the fifth evaporator stage 92E5, the sixth absorber stage 91A6 with the fourth evaporator stage 92E4, the seventh absorber stage 91A7 with the third evaporator stage 92E3, the eighth absorber stage 91A8 with the second evaporator stage 92E2, and the ninth (last) absorber stage 91A1 with the first evaporator stage 92E1, respectively; a first solution passage 94S1 which connects the first absorber stage 91A1 with the second absorber stage 91A2 and sends a solution from the former to the latter, and further second to eighth solution passages 94S2, 94S3, 94S4, 94S5, 94S6, 94S7 and 94S8 which connect likewise the second and third absorber stages 91A2 and 91A3, the third and fourth absorber stages 91A3 and 91A4, the fourth and fifth absorber stages 91A4 and 91A5, the fifth and sixth absorber stages 91A5 and 91A6, and sixth and seventh absorber stages 91A6 and 91A7, the seventh and eighth absorber stages 91A7 and 91A8, and the eighth and ninth absorber stages 91A8 and 91A9, respectively; a first return solution passage 95S1 which connects the first evaporator stage 92E1 with the second evaporator stage 92E2 and makes the solution of the former to the latter, and further second to eighth return solution passages 95S2, 95S3, 95S4, 95S5, 95S7 and 95S8 which connect likewise the second and third evaporator stages 92E2 and 92E3, the third and fourth evaporator stages 92E3 and 92E4, the fourth and fifth evaporator stages 92E4 and 92E5, the fifth and sixth evaporator stages 92E5 and 92E6, the sixth and seventh evaporator stages 92E6 and 92E7, the seventh and eighth evaporator stages 92E7 and 92E8, and the eighth and ninth evaporator stages 92E8 and 92E9 together, respectively; and pumps 96P1, 96P2, 96P3, 96P4, 96P5, 96P6, 96P7 and 96P8 which are interposed in the above-stated first to eighth solution passages 94S1 to 94S8 respectively. For these pumps 96P1 to 96P9, pump units connected to one shaft can be employed. The first absorber stage 91A1 is connected to the discharge side of the solution pump 8 through a solution passage 94S0, the ninth absorber stage 91A9 is connected to the first generator 4 through a first solution supply channel 97S1 with the pump 96P9, the sixth solution passage 94S6 is connected to the second generator 5 through a second solution supply channel 97S2, the third solution passage 94S3 is connected to the third generator 6 through a third solution supply channel 97S3, the first evaporator stage 92E1 is connected to the first generator 4 through a first concentrated solution return passage 98S1, the fourth evaporator stage 92E4 is connected to the second generator 5 through a second concentrated solution return passage 98S2, the seventh evaporator stage 92E7 is connected to the third generator 6 through a third concentrated solution return passage 98S3, and the ninth (last) evaporator stage 92E9 is connected to the piping of the spray header 22 of the primary absorber 2 through the ninth return solution passage 95S9.

In addition, an ejector 10 is disposed in the joining section of the piping of the spray header 22 and the ninth return solution passage 95S9.

Next, the operation of this apparatus will be described in the following.

The solution in the first generator 4 is heated by the heater 41, and thereby refrigerant vapor is generated. This refrigerant vapor is introduced into the heating pipe 51, whereby the solution in the second generator 5 is heated to generate refrigerant vapor. The refrigerant vapor generated in the second generator 5 is introduced into the heating pipe 61, whereby the solution in the third generator 6 is heated to generate refrigerant vapor. All of the refrigerant vapor generated in the third generator 6, the refrigerant which, after heating the second generator 5, flows further through the third generator 6 and heats the solution in this generator, and the refrigerant which is generated in the second generator 5 and heats the solution in the third generator 6, flow into the condenser 3.

The refrigerant (vapor and liquid) flowing into the condenser 3 is cooled by the cooling water flowing through the cooling water pipe 31. The refrigerant liquid thus cooled flows into the evaporator 1 under low pressure, and is evaporated therein by the latent heat of vaporization which it takes in from the water flowing through the cold water pipe 11. Said water is cooled as a result of the latent heat of vaporization being taken from said water during vaporization, and thus cold water is produced. The refrigerant vapor thus evaporated flows into the primary absorber 2 through an eliminator for eliminating droplets of liquid, and is absorbed therein by the solution sprayed from the spray header 22, while being cooled by the cooling water which passes through the cooling water pipe 21. Consequently, the solution in the primary absorber 2 turns into a relatively thin solution.

The solution in the primary absorber 2 is sent through the solution passage 94S0 by the solution pump 8 and sprayed in the first auxiliary absorber stage 91A1, and the solution in said absorber stage 91A1 is supplied through the solution passage 94S1 by the pump 96P1 and sprayed in the second auxiliary absorber stage 91A2. The solution is sprayed likewise in the subsequent auxiliary absorber stages sequentially, and the solution in the ninth (last) absorber stage 91A9 is supplied to the first generator 4 through the first solution supply channel 97S1 by the pump 96P9. Meanwhile, the solution in the first absorber stage 91A3 positioned in the middle of the stages is supplied to the third generator through the third solution supply channel 97S3 by the pump 96P3, and the solution in the sixth absorber stage 91A6 is supplied into the second generator 5 through the second solution supply channel 97S2 by the pump 96P6. The concentrated solution of the first generator 4 flows, due to the pressure differential, into the first auxiliary evaporator stage 92E1 through the first concentrated solution return passage 98S1, while the solution of said first evaporator stage 92E1 flows, due to the pressure differential, into the second absorber stage 92E2 through the first return passage 95S1. The solution flows likewise into the subsequently evaporator stages sequentially, and the solution of the ninth (last) evaporator stage 91E9 flows, due to the pressure differential, into the ejector 10 throgh the ninth return solution passage 95S9 and is sprayed into the primary absorber 2 from the spray header 22. Meanwhile, the concentrated solution of the second generator 5 flows into the fourth evaporator stage 92E4 positioned in the middle of the stages, through the second concentrated solution return passage 98S2, and the concentrated solution of the third generator 6 flows into the seventh evaporator stage 92E7 through the third concentrated solution return passage 98S3. The evaporator stages 92E1 to 92E9 are disposed in the return passage of the solution from the generators to the primary absorber 2, and a pressure differential is formed between adjacent evaporator stages since a pressure difference exists between the generators and the primary absorber 2. Therefore, the refrigerant in the solution vaporizes every time that the solution flows from a given evaporator stage to a subsequent one, thereby increasing the concentration of the solution, while the temperature thereof is lowered by self-refrigeration.

The refrigerant vapor self-vaporizing in the evaporator stages 92E1 to 92E9 flows into the auxiliary absorber stages 91A1 to 91A9 through the vapor passages 93V1 to 93V9, respectively. This refrigerant vapor is absorbed by the solutions sprayed from the solution passages 94S0 to 94S8, and the solution are diluted therewith. Simultaneously when the refrigerant vapor is absorbed by the solutions, the heat of absorption is generated, and the temperature of the solutions is raised by this heat.

As described above, the solution supplied from the primary absorber 2 to each of the generators 4, 5 and 6 is sprayed in the sequential auxiliary absorber stages 91A, where it repeatedly absorbs the refrigerant vapor supplied from the auxiliary evaporator stages 92E communicating with said absorber stages, respectively. Thereby the concentration of the solution is decreased, the temperature thereof is raised, and thus the solution more diluted than that at the outlet of the absorber 2 is supplied to each of the generators 4, 5 and 6. The solution returns from each of the generators 4, 5 and 6 to the primary absorber 2 flows (flushes) into the sequential auxiliary evaporator stages 92E, and each time that this occurs, the refrigerant in the solution vaporizes therein. With this self-vaporization, the concentration of the solution is increased, while the temperature thereof is lowered, and thus the solution is more concentrated than that at the outlet of each of the generators 4, 5 and 6 when it returns to the absorber 2.

While the supply of the solution to each absorber stage is conducted by a pump in the above-described embodiment, it may be conducted also by using a difference in levels of absorber stages which can be formed by disposing a first absorber stage at a high position and second and subsequent absorber stages at sequentially-descending positions.

According to the present embodiment, as described above, a very thin solution can be supplied to each generator owing to the provision of the direct contact type heat exchanger in which self-vaporization and absorption are repeated in a plurality of stages and a solution is supplied from the final and intermediate auxiliary absorber stages to each generator separately without flowing through other generators.

Since the multi-effect absorption refrigerating machine is so constructed that refrigerant vapor generated in a preceding generator is used as a heat source of a succeeding generator, the heating temperature of the generator (first generator) at which the temperature is maximum is determined by the concentration of the solution in this generator and the saturation vapor pressure of the generator which uses the refrigerant vapor generated in said generator as a heat source. Accordingly, in the embodiment of this invention in which a solution, a very thin solution obtained by the direct contact type heat exchanger, is supplied to each of the second and third generators separately without passing through the other, the heating temperature of the first generator which is requisite for operating the entire apparatus can be lowered.

According to this embodiment, the temperature of the solution of the first generator which is requisite for the entire apparatus is lowered by 20° to 30° C., and the temperature of the heat source can be lowered in the same degree according thereto. At the same time, the temperature of the solution can be maintained lower than the temperature at which corrosion is accelerated, thereby reducing or eliminating the corrosion of the generators.

Moreover, the second generator is supplied with the solution from the sixth auxiliary absorber stage, while the third generator is supplied with the solution from the third auxiliary absorber stage, and thus the distribution of the quantity of the solution supplied to each generator can be performed easier than in an apparatus in which the solution is distributed from one source to each generator. In addition, since the transfer of the solution between the adjacent absorber stages is conducted by pumps, a uniform flow rate can be maintained even when a change in a differential pressure occurs between the first generator and the absorber stages due to a change in refrigeration capacity.

What is claimed is:

1. In a multi-effect absorption refrigerating machine which is provided with an evaporator, a primary absorber, a condenser and at least two generators which are connected so that refrigerant vapor generated in one generator is used as a heat source for a subsequent generator, a refrigerant generated in each generator is cooled into a liquid by the condenser, the refrigerant liquid thus prepared is introduced into the evaporator and evaporated therein, the refrigerant vapor thus formed is introduced into the absorber and is absorbed therein by the solution returning from the generators, and the solution having absorbed the refrigerant vapor is supplied to the generators, a multi-effect absorption refrigerating machine which is characterized in that auxiliary evaporator-absorber stages composed of auxiliary evaporator stages making the refrigerant vapor vaporize from the solution and auxiliary absorber stages connected with said evaporator stages through vapor passages and absorbing the refrigerant vapor are provided in a plural set; solution passages, each connecting one evaporator stage with the adjacent one are provided between the adjacent ones of the evaporator stages so that the solution may flow serially; solution passages, each connecting one absorber stage with the adjacent one are provided between the adjacent ones of the absorber stages so that the solution may flow serially, the absorber stages of the evaporator-absorber stages are disposed in a solution supply channel from the primary absorber to the generators, the evaporator stages of the evaporator-absorber stages are disposed in a solution return channel from the generators to the primary absorber, and part of the solution taken out of the final absorber stage of each evaporator-absorber stage is supplied to each generator separately.

2. A multi-effect absorption refrigerating machine according to claim 1, which is characterized in that three generators are provided, the auxiliary evaporator-absorber stages in a plural set are divided into three groups, the solution passages for connection are provided so that part of the solution taken out of the final absorber stage of the evaporator-absorber stages in a first group is supplied to a third generator, part of the solution taken out of the final absorber stage of the evaporator-absorber stages in a second group is supplied to a second generator, and the solution taken out of the final absorber stage of the evaporator-absorber stages in a third group is supplied to a first generator, and the solution passages for introduction are provided so that the solution from the third generator is introduced into the initial evaporator stage of the evaporator-absorber stages in the first group, the solution from the second generator is introduced into the initial absorber stage of the evaporator-absorber stages in the second group, and the solution from the first generator is introduced into the initial absorber stage of the evaporator-absorber stage in the third group.

3. A multi-effect absorption refrigerating machine according to claim 1, which is characterized in that a pump is provided in each solution passage connecting one absorber stage with the adjacent one in the evaporator-absorber stages in a plural set.

4. A multi-effect absorption refrigerating machine according to claim 2, which is characterized in that a pump is provided in each solution passage connecting one absorber stage with the adjacent one in the evaporator-absorber stages in a plural set.

5. A multi-effect absorption refrigerating machine according to claim 2, which is characterized in that the evaporator-absorber stages in each group comprise three sets of evaporator and absorber stages.

6. A multi-effect absorption refrigerating machine according to claim 4, which is characterized in that the evaporator-absorber stages in each group comprise three sets of evaporator and absorber stages.

* * * * *